US010657493B2

(12) United States Patent
Miller

(10) Patent No.: US 10,657,493 B2
(45) Date of Patent: May 19, 2020

(54) METHOD AND SYSTEM FOR RATING A BASEBALL PLAYER'S PERFORMANCE IN PRESSURE SITUATIONS

(75) Inventor: Robin T. Miller, East Northport, NY (US)

(73) Assignee: Clutch Hitter, Inc., East Northport, NY (US)

( * ) Notice: Subject to any disclaimer, the term of this patent is extended or adjusted under 35 U.S.C. 154(b) by 944 days.

(21) Appl. No.: 12/817,343

(22) Filed: Jun. 17, 2010

(65) Prior Publication Data

US 2010/0256789 A1 Oct. 7, 2010

Related U.S. Application Data

(60) Provisional application No. 61/218,022, filed on Jun. 17, 2009.

(51) Int. Cl.
| | |
|---|---|
| *A63F 9/00* | (2006.01) |
| *G06Q 10/10* | (2012.01) |
| *G06Q 50/10* | (2012.01) |
| *A63B 102/18* | (2015.01) |
| *A63B 71/06* | (2006.01) |

(52) U.S. Cl.
CPC ............. *G06Q 10/10* (2013.01); *G06Q 50/10* (2013.01); *A63B 71/0616* (2013.01); *A63B 2102/18* (2015.10); *A63B 2225/20* (2013.01); *A63B 2225/50* (2013.01)

(58) Field of Classification Search
USPC .......................................................... 700/91
See application file for complete search history.

(56) References Cited

U.S. PATENT DOCUMENTS

| 5,189,630 | A | 2/1993 | Barstow et al. ............... 364/514 |
|---|---|---|---|
| 5,526,479 | A | 6/1996 | Barstow et al. ............... 395/152 |
| 5,671,347 | A | 9/1997 | Barstow et al. ............... 395/173 |
| 6,204,862 | B1 | 3/2001 | Barstow et al. ............... 345/473 |
| 7,373,587 | B1 | 5/2008 | Barstow et al. ............... 715/203 |
| 2003/0200054 | A1* | 10/2003 | Storch .................... A63B 71/06 702/182 |
| 2005/0060121 | A1* | 3/2005 | Storch .................... A63B 71/06 702/182 |
| 2005/0113703 | A1* | 5/2005 | Farringdon .......... A61B 5/0428 600/509 |

(Continued)

OTHER PUBLICATIONS

Wikipedia, "Late-inning pressure situations (LIPS)," http://en.wikipedia.org/wiki/Late-inning_pressure_situations_(LIPS), 1 page, last modified Jul. 22, 2010.

(Continued)

*Primary Examiner* — Seng H Lim
(74) *Attorney, Agent, or Firm* — Nutter McClennen & Fish LLP

(57) ABSTRACT

Illustrative embodiments of the present invention are directed to a method for rating a baseball player's performance in pressure situations. The method includes receiving information about at bat situations associated with a player from at least one information source. The method determines whether the at bat situations are pressure at bat situations based upon baseball fan participation. Using the information from pressure at bat situations, the method calculates at least one pressure situation statistic for the player. The pressure situation statistic is then communicated to a baseball fan.

29 Claims, 2 Drawing Sheets

(56) References Cited

U.S. PATENT DOCUMENTS

| | | | | |
|---|---|---|---|---|
| 2005/0239551 | A1* | 10/2005 | Griswold et al. | 463/42 |
| 2009/0262137 | A1* | 10/2009 | Walker et al. | 345/629 |
| 2013/0218310 | A1* | 8/2013 | Johnson | G06Q 10/00 |
| | | | | 700/91 |
| 2013/0259369 | A1* | 10/2013 | McVey | G06K 9/4642 |
| | | | | 382/168 |

OTHER PUBLICATIONS

"Do Clutch Hitters Exist?," http://remarque.org/~grabiner/bosclutch.pdf, 26 pages, May 20, 2006.
Baseball Fever, "Hitting with RISP," http://www.baseball-fever.com/showthread.php?38738-Hitting-with-RISP, 11 pages, Jan. 21, 2006.
Business Wire, "DDB Technologies and MLB Advanced Media Reach Patent Portfolio Agreement," http://findarticles.com/p/articles/mi_m0EIN/is_20100329/ai_n52959170/, 2 pages, Mar. 29, 2010.
"Do Clutch Hitters Exist?," Society for American Baseball Research—Research Journal Archives, http://research.sabr.org/journals/do-clutch-hitters-exist, 3 pages, 2005-2010.
Wikipedia, "Clutch Hitter," http://en.wikipedia.org/wiki/Clutch_hitter, 4 pages, last modified Aug. 12, 2010.

* cited by examiner

METHOD AND SYSTEM FOR RATING A BASEBALL PLAYER'S PERFORMANCE IN PRESSURE SITUATIONS

PRIORITY

The present application claims the benefit of U.S. Application Ser. No. 61/218,022, filed Jun. 17, 2009, which application is incorporated herein, in its entirety, by reference.

TECHNICAL FIELD

The present invention relates to baseball, and more particularly to methods and systems for calculating baseball statistics.

BACKGROUND

It was known in the baseball prior art to use statistics to summarize a player's performance and attempt to measure a player's value. One of these statistics is referred to as the batting average. The batting average can be obtained by dividing a player's hits by the total number of at bat situations. Accordingly, a player with a 0.400 batting average has hit the ball 4 times for every 10 at bat situations. Although the batting average statistic provides some insight into the batting skills of the player, it does not provide any insight as to the importance or value of the hits to baseball fans. For example, although a first player might have a relatively low batting average, many of his hits may have been important game winning hits. Therefore, the value of this first player may be more than that of a second player with a higher batting average. The batting average statistic fails to account for hits during such important pressure situations.

SUMMARY

Illustrative embodiments of the present invention are directed to a method for rating a baseball player's performance in pressure situations. The method includes receiving information about at bat situations associated with a player from at least one information source. The method determines whether the at bat situations are pressure at bat situations based upon baseball fan participation. Using the information from pressure at bat situations, the method calculates at least one pressure situation statistic for the player. The pressure situation statistic is then communicated to a baseball fan.

In one exemplary embodiment, the pressure statistic is a pressure average. In the pressure average embodiment, calculating the pressure situation statistic for the player further includes determining whether the player positively contributed during each of his pressure at bat situations and tabulating total positive contributions. The method also includes determining the pressure average by comparing the total positive contributions to the total pressure at bat situations for the player.

In another exemplary embodiment, the pressure statistic is a pressure rating. In such an embodiment, the method includes receiving a plurality of fan ratings for at bat situations associated with the player. The information about the plurality of at bat situations includes the inning associated with each at bat situation. The pressure rating is calculated by averaging the plurality of fan ratings for each pressure at bat situation and determining a product for each pressure at bat situation by multiplying the average fan rating for each at bat situation by an inning rating factor. The inning rating factor is based, at least in part, on the inning associated with the at bat situation. The pressure rating is then calculated by summing the products for each pressure at bat situation.

In yet another illustrative embodiment, the pressure statistic is a pressure predictor. In the pressure predictor embodiment, the method includes receiving at least one fan prediction for an at bat situation. The fan prediction predicts whether a player will contribute positively or negatively during the at bat situation. The pressure predictor is calculated by determining whether the player contributed positively or negatively during the at bat situation associated with the at least one fan prediction. The method further includes determining whether the at least one fan prediction is correct and tabulating a total number of correct fan predictions. The pressure predictor is calculated by dividing the total number of correct fan predictions by a total number of fan predictions.

Illustrative embodiments of the present invention are also directed to a non-transitory computer readable medium encoded with instructions for rating a baseball player's performance in pressure situations, which when loaded on at least one computer, establish processes that include receiving information about at bat situations associated with a player from at least one information source. The media also includes processes for determining whether the at bat situations are pressure at bat situations based upon baseball fan participation. Using the information from pressure at bat situations, the at least one pressure situation statistic is calculated for the player. The pressure situation statistic is then communicated to a baseball fan.

In one exemplary embodiment, the pressure statistic is a pressure average. In the pressure average embodiment, calculating the pressure situation statistic for the player further includes determining whether the player positively contributed during each of his pressure at bat situations and tabulating total positive contributions. The media also includes processes for determining the pressure average by comparing the total positive contributions to the total pressure at bat situations for the player.

In another exemplary embodiment, the pressure statistic is a pressure rating. In such an embodiment, the media includes processes for receiving a plurality of fan ratings for at bat situations associated with the player. The information about the plurality of at bat situations includes the inning associated with each at bat situation. The pressure rating is calculated by averaging the plurality of fan ratings for each pressure at bat situation and determining a product for each pressure at bat situation by multiplying the average fan rating for each at bat situation by an inning rating factor. The inning rating factor is based, at least in part, on the inning associated with the at bat situation. The pressure rating is then calculated by summing the products for each pressure at bat situation.

In yet another illustrative embodiment, the pressure statistic is a pressure predictor. In the pressure predictor embodiment, the media includes processes for receiving at least one fan prediction for an at bat situation. The fan prediction predicts whether a player will contribute positively or negatively during the at bat situation. The pressure predictor is calculated by determining whether the player contributed positively or negatively during the at bat situation associated with the at least one fan prediction. The media further includes processes for determining whether the at least one fan prediction is correct and tabulating a total number of correct fan predictions. The pressure predictor is calculated by dividing the total number of correct fan predictions by a total number of fan predictions.

Illustrative embodiments of the present invention are also directed to a system for rating a baseball player's performance in pressure situations. The system includes a processor and a memory storing instructions executable by the processor to perform processes that include receiving information about at bat situations associated with a player from at least one information source. The memory also includes processes for determining whether the at bat situations are pressure at bat situations based upon baseball fan participation. Using the information from pressure at bat situations, the at least one pressure situation statistic for the player is calculated. The pressure situation statistic is then communicated to a baseball fan.

In one exemplary embodiment, the pressure statistic is a pressure average. In the pressure average embodiment, calculating the pressure situation statistic for the player further includes determining whether the player positively contributed during each of his pressure at bat situations and tabulating total positive contributions. The memory also includes processes for determining the pressure average by comparing the total positive contributions to the total pressure at bat situations for the player.

In another exemplary embodiment, the pressure statistic is a pressure rating. In such an embodiment, the memory includes processes for receiving a plurality of fan ratings for at bat situations associated with the player. The information about the plurality of at bat situations includes the inning associated with each at bat situation. The pressure rating is calculated by averaging the plurality of fan ratings for each pressure at bat situation and determining a product for each pressure at bat situation by multiplying the average fan rating for each at bat situation by an inning rating factor. The inning rating factor is based, at least in part, on the inning associated with the at bat situation. The pressure rating is then calculated by summing the products for each pressure at bat situation.

In yet another illustrative embodiment, the pressure statistic is a pressure predictor. In the pressure predictor embodiment, the memory includes processes for receiving at least one fan prediction for an at bat situation. The fan prediction predicts whether a player will contribute positively or negatively during the at bat situation. The pressure predictor is calculated by determining whether the player contributed positively or negatively during the at bat situation associated with the at least one fan prediction. The memory further includes processes for determining whether the at least one fan prediction is correct and tabulating a total number of correct fan predictions. The pressure predictor is calculated by dividing the total number of correct fan predictions by a total number of fan predictions.

In some or all of the above described embodiments, the pressure at bat situations are defined by fantasy baseball participants. Additionally or alternatively, the positive pressure contributions are defined by fantasy baseball participants. Furthermore, the fan ratings are from fantasy baseball participants.

In some or all of the above described embodiments, the pressure predictor is specific to a particular baseball fan. In other embodiments, the pressure predictor is specific to a particular baseball player. Also, in exemplary embodiments, the at least one fan prediction is from a fantasy baseball participant.

BRIEF DESCRIPTION OF THE DRAWINGS

The foregoing features of the invention will be more readily understood by reference to the following detailed description, taken with reference to the accompanying drawings, in which.

DETAILED DESCRIPTION OF SPECIFIC EMBODIMENTS

Illustrative embodiments of the present invention are directed to a method and system for calculating a set of statistics and ratings that reveal the performance of a baseball player in pressure situations. In some embodiments, the statistics and ratings are determined using predetermined parameters, baseball fan voting, and/or fantasy baseball fan voting. Illustrative embodiments of the present invention include a pressure average statistic and a league pressure average, which help define the value of a baseball player in pressure situations. Other embodiments of the present invention include a pressure rating and a league pressure rating, which define the positive and negative contributions of a baseball player in pressure situations. Some embodiments of the present invention may include a pressure predictor and a league pressure predictor, which define the likelihood of a baseball player producing a positive contribution in pressure situations.

Figure 1:
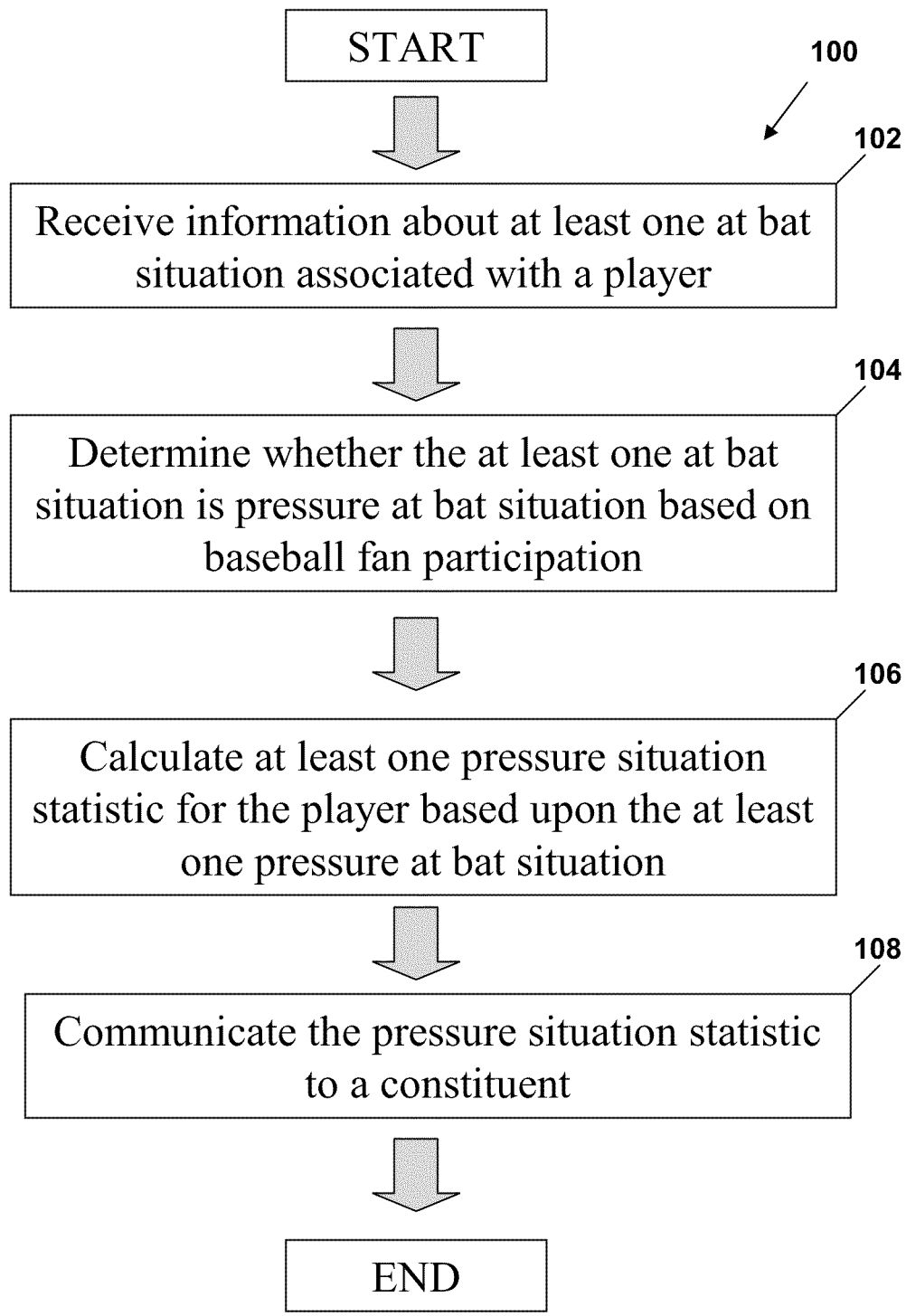
FIG. 1 shows a method for rating a baseball player's performance in pressure situations, in accordance with one embodiment of the present invention.
Figure 2:
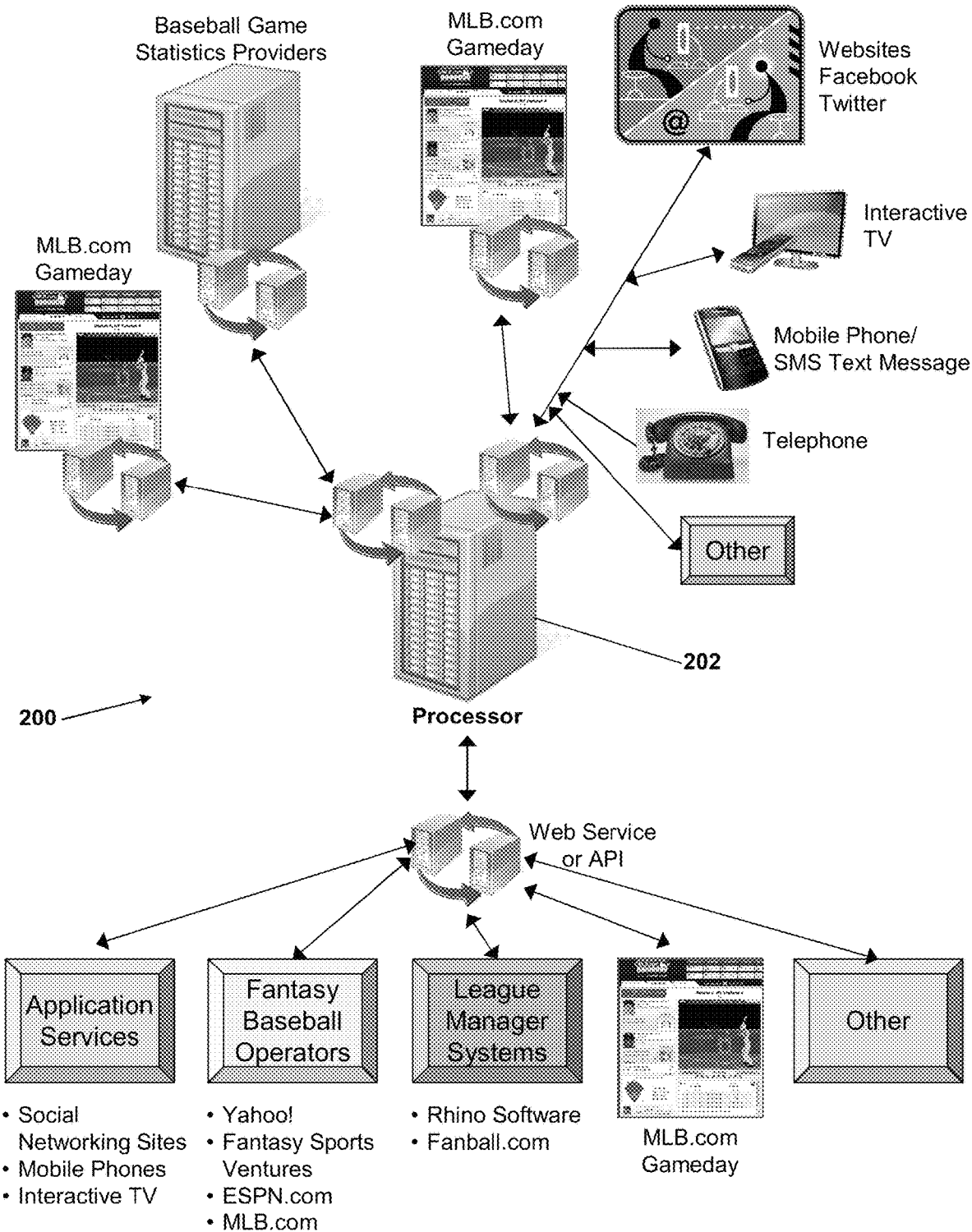
FIG. 2 is a schematic representation of a system for rating a baseball player's performance in pressure situations, in accordance with one embodiment of the present invention.

FIG. 1 shows a method for rating a baseball player's performance in pressure situations 100, in accordance with one embodiment of the present invention. In illustrative embodiments the method is implemented using a processor 202, which is shown in FIG. 2 as part of a system 200, in accordance with one embodiment of the present invention. In some embodiments, the processor 102 may be a server which is in communication with a computer network such as the Internet.

The method 100 further includes receiving information about at bat situations associated with a player from an information source 102. In exemplary embodiments, the processor 202 receives information over the Internet from one or more information sources. For example, the processor 202 may receive information from a variety of different information sources, including, but not limited to:

MLB.com Gameday
Baseball Game Statistics Providers
Social Networking Sites
  Facebook
  Twitter
Interactive TV
Mobile Phones
SMS Text Messages
Telephones
Websites
Fantasy Baseball Operators
  Yahoo!
  Fantasy Sports Ventures
  ESPN.com
  MLB.com
League Manager Systems
  Rhino Software
  Fanball.com Major League Baseball (MLB)
Baseball Game Statistical Providers
Society for American Baseball Research (SABR)
STATS
The Sports Network (TSN)
Other automated data collection and voting mechanisms In some embodiments, the information is received over the Internet from a remote information source. In other embodiments, however, the information is received from a local information source such as a memory device in communication with the server or the memory device within the server itself.

Once the information about the at bat situations is received, the method 100 determines whether the at bat situations are pressure at bat situations based at least in part on baseball fan participation 104. Using the pressure at bat situations, the processor 202 then calculates at least one pressure situation statistic for the player 106. The pressure situation statistic may be one of a pressure average, league pressure average, pressure rating, league pressure rating, pressure predictor, and/or league pressure predictor as described below. Once the pressure situation statistic is calculated, it is communicated to a baseball fan 108. The term "baseball fan" is inclusive of parties interested in baseball such as people who watch baseball, fantasy baseball participants, baseball players, coaches, and Major League Baseball (MLB) itself. The pressure situation statistics may be communicated to the baseball fan by simply displaying the pressure statistic on a display of a monitor. In exemplary embodiments, the pressure situation statistics is communicated to the baseball fan via a number of different media such as the Internet, television, and/or hard copy media (e.g., newspapers and magazines). In some embodiments, the processor 202 may communicate pressure situation statistics to the baseball fan by communicating them back to the source from which it received information (e.g. the information source can be considered a baseball fan). In exemplary embodiments of the present invention, pressure situation statistics may be communicated to any one of the information sources listed above. In some cases, the pressure situation statistics may be delivered via a web service or an Application Programming Interface (API).

In illustrative embodiments of the present invention, the processor 202 is programmed to calculate at least one pressure situation statistic. In one embodiment, the processor 202 calculates a pressure average. The pressure average may be defined by the following formula:

Pressure Average=Number of PPCs÷Number of PABs

PAB stands for "pressure at bat." In some exemplary embodiments, a pressure at bat situation occurs for a baseball player's at bat (commonly referred to by baseball statisticians as the "AB") when the player's team is in a tied ballgame in a certain inning and/or when the player's team is behind by a certain number of runs in any inning. In other embodiments, a pressure at bat may be defined differently. In additional or alternative embodiments, whether or not a pressure at bat situation occurs for a baseball player's at bat may depend on baseball fan participation. For example, baseball fans may vote to determine whether an at bat is a pressure at bat situation via, among other things, the Internet and fantasy baseball leagues. If ≥80% of baseball fans who vote deem the at bat to be a pressure situation, then the processor 202 classifies the at bat as a pressure at bat situation. In other embodiments, other standards could be used for qualifying pressure at bat situations. For example, ≥50%, 75%, or 95% might be necessary to qualify the at bat as a pressure at bat situation. The vote may be a simple "yes" or "no" as to whether the at bat situation qualifies as a pressure situation. A pressure at bat situation that is qualified through voting may be referred to as a voted pressure at bat situation (VPAB). The votes may be received by the processor 202 through, for example, interactive television and/or a website. Votes may be collected from baseball fans, fantasy baseball participants, and/or others parties interested in baseball. In some embodiments, the processor 202 receives and tallies the votes. In other embodiments, the information sources described above may be used to compile and/or count votes and the processor 202 receives the compilation and/or count from the information source. In additional or alternative embodiments, votes may be gathered and received from the following non-limiting list of information sources:

MLB.com Gameday
Internet Websites
Facebook
Twitter
Interactive Cable TV
Mobile phones/SMS text message
Landline phones
Other automated data collection and voting mechanisms With respect to the above stated formula, PPC stands for "positive pressure contribution." In exemplary embodiments, a positive pressure contribution occurs when any one of the following results from a PAB: a walk, single, double, triple, home run or grand slam, sacrifice bunt, sacrifice fly, fielder's choice which advances a runner or scores a run, intentional walk, and hit by pitch. Illustrative embodiments of the present invention may define the PPC differently. For example, in some embodiments, a PPC occurs only if a runner scores. Irrespective of the manner a PPC is defined, the pressure average is the total number of PPCs compared to the total number of PABs. For example, if a player has a total of 25 pressure at bat situations over the season and he has a total of 10 pressure at bat contributions from those situations, then his pressure average is 0.40, or 40%, for the season.

In illustrative embodiments of the present invention, the processor 202 may additionally or alternatively be programmed to calculate a league pressure average (LPA). The league pressure average may be defined by the following formula:

League Pressure Average=Number of LPPCs÷Number of LPABs

LPAB in the formula stands for "league pressure at bat." In illustrative embodiments of the present invention, the league pressure at bat is defined by fantasy baseball participants (e.g., fantasy baseball team managers, fantasy baseball fans, fantasy baseball organizers and/or fantasy baseball operators). For example, in some embodiments, a league pressure at bat situation occurs for a baseball player's at bat when the player's team is in a tied ballgame in the Wth inning or later, or when the player's team is behind by X-Y runs in any inning. In alternative or additional embodiments, the at bat may be classified as an LPAB if ≥Z % of fantasy baseball participants who vote deem the at bat to be a pressure situation. The variables W, X, Y and Z are uniquely set by fantasy baseball participants for a number of different fantasy leagues. The variables may be received by the processor 202 from the fantasy baseball operators and/or from fantasy league websites, such as Yahoo! and Fantasy Sports Ventures. In this manner, exemplary embodiments of the LPA take into account baseball fan participation.

LPPC in the formula stands for "league positive pressure contribution." In illustrative embodiments, the league positive pressure contribution is defined by at least one of the fantasy baseball participants. For example, the fantasy baseball participants may select one or more of the following as league positive pressure contributions: a walk, single, double, triple, home run or grand slam, sacrifice bunt, sacrifice fly, fielder's choice which advances a runner or scores a run, intentional walk, and/or hit by pitch. Therefore, the league pressure average statistic is similar to pressure average in that they both define the total number of positive contributions compared to the total number of pressure situations over a period of time.

In illustrative embodiments of the present invention, the processor 202 may additionally or alternatively be programmed to calculate a pressure rating (PR). In exemplary embodiments, the pressure rating is calculated and updated for a particular player throughout the season. The pressure rating depends on votes collected from baseball fans, fantasy baseball participants, and others. The pressure rating is a summation of the inning rating multiplied by the average fan rating for each pressure at bat situation in which a baseball player participates. As explained above, the voting may be received by the processor 202 from, for example, the baseball fan's mobile phone via a text message or the vote may come from a website. The pressure rating may be defined by the following formula and table:

$$\text{Pressure Rating} = aA+bB+cC+dD+eE+fF+gG+hH+iI+jJ+kK+lL+mM+nN\ldots$$

| Inning | Inning Rating | Average Fan Rating |
|---|---|---|
| 1 | a | A |
| 2 | b | B |
| 3 | c | C |
| 4 | d | D |
| 5 | e | E |
| 6 | f | F |
| 7 | g | G |
| 8 | h | H |
| 9 | i | I |
| 10 | j | J |
| 11 | k | K |
| 12+ | l, m, n . . . | L, M, N . . . |

In the above table, the inning rating is a scoring factor assigned to each inning of a baseball game which expresses the increased value of a baseball player's performance as the game draws closer to the end. For example, in some embodiments, inning 1 may be assigned a factor of one, inning 2 may be assigned a factor of two, inning 3 may be assigned a factor of three, and so on. Typically, innings after the 9th inning will have the highest assigned factors. In other embodiments, however, the inning rating may be calculated from a unique combination of baseball fan voting information and information from other information sources. For example, a voter may place a general value/scoring factor on each inning in a baseball game which expresses the increased value of a baseball player's performance as the game draws closer to the end. In other words, voters may assign a value between, for example, 1 through 20 for each inning of a baseball game. Such voting may be factored in with other variables and voting information to define the final inning rating.

In the above table, the average fan rating is calculated by taking the average of the individual fan rating votes for each at bat situation for a particular player. In various embodiments, the voting for the at bat situation only has an impact on the pressure rating if the at bat situation is a pressure at bat situation. For example, if ≥80% of baseball fans who vote deem the at bat to be a pressure situation (VPAB), then the fan voting for that particular situation has an impact on the player's pressure rating. If <80% of baseball fans who vote deem the at bat to be a pressure situation, then the average fan rating for that at bat situation is zero ("0") and that particular at bat situation does not have an impact on the pressure rating. In some exemplary embodiments, the fan rating vote may be selected from a scale of −10 to 10. In this way, the fan determines the value of the outcome of the pressure at bat situation. For example, if the player scores a grand slam, the fan may vote a 10, whereas, if the player is walked, the fan may only vote a value of 3. However, if a player strikes out, the fan may vote a value of −5. In this manner, the pressure rating helps define baseball fans' opinions of a player's performance in pressure situations.

In illustrative embodiments of the present invention, the processor 202 may additionally or alternatively be programmed to calculate a league pressure rating (LPR). The league inning rating is multiplied by the league rating for each pressure at bat situation. The league pressure rating is based on league ratings from fantasy baseball participants. In this manner, the league pressure rating helps define fantasy baseball participants' opinions of a player's performance in pressure situations.

The league pressure rating is defined according to the following formula and table:

$$\text{League Pressure Rating} = aA+bB+cC+dD+eE+fF+gG+hH+iI+jJ+kK+lL+mM+nN\ldots$$

| Inning | League Inning Rating | League Rating |
|---|---|---|
| 1 | a | A |
| 2 | b | B |
| 3 | c | C |
| 4 | d | D |
| 5 | e | E |
| 6 | f | F |
| 7 | g | G |
| 8 | h | H |
| 9 | i | I |
| 10 | j | J |
| 11 | k | K |
| 12+ | l, m, n . . . | L, M, N . . . |

Like the inning rating, the league inning rating in the table above is a scoring factor assigned to each inning of a baseball game which expresses the increased value of a baseball player's performance as the game draws closer to the end. The league inning rating may be obtained in a similar manner to the inning rating. For example, in illustrative embodiments, the league inning rating is based on a value/scoring factor assigned by fantasy baseball participants.

The league rating in the table is typically obtained based on voting from fantasy baseball participants. The league rating may be obtained by taking an average of the individual fan rating votes for each pressure at bat situation for a particular player. In illustrative embodiments, an at bat situation is defined as a pressure at bat situation when ≥Z % of fantasy baseball participants who vote deem the particular at bat to be a pressure situation. If <Z % of fantasy baseball participants who vote deem the at bat to be a pressure situation, then the league rating for that at bat is zero ("0") and the player's league rating is unaffected by that particular at bat. The value of Z is set by fantasy baseball participants.

In other exemplary embodiments of the present invention, the league rating is obtained using a league positive pressure contribution rating (LPPCR) and/or a league negative pressure contribution rating (LNPCR). The LPPCR and LNPCR are assigned scoring factors for at bat situations. A league positive pressure contribution rating (LPPCR) is defined by at least one fantasy baseball participant. The fantasy baseball participants may select and assign a particular scoring factor for each one of the following possible results of a league pressure at bat situation: a walk, single, double, triple, home run or grand slam, sacrifice bunt, sacrifice fly, fielder's choice which advances a runner or scores a run, intentional walk, and/or hit by pitch. For example, a home run may be assigned a value of 8 on a scale from 1 to 10. Thus, if Player A's first pressure at bat situation comes in the second inning of the first game of the season and Player A scores a home run, then his league positive pressure contribution rating is an 8 for that particular at bat situation. Further, if the league inning rating for the second inning is 2, then Player A's league pressure rating for the season is 16.

A league negative pressure contribution rating (LNPCR) is also defined by the fantasy baseball participants. The fantasy baseball participants may select and assign a particular scoring factor for each one of the following possible results of a league pressure at bat situation: a strike out, ground out which does not advance the runner or score a run, fly out which does not advance the runner or score a run, fielder's choice which does not advance a runner or score a run, and/or ground into double play or ground into triple play. For example, a strike out may be assigned a value −8 on a scale from −1 to −10. Thus, if, later in the fifth inning, Player A strikes out during his second pressure at bat situation, then the league negative pressure contribution rating is a −8 for that particular at bat situation. If the fifth inning has a league inning rating of 5, then Player A's league rating for the season is −24 (e.g., −40 from second pressure at bat situation summed with 16 from first pressure at bat situation).

In other exemplary embodiments of the present invention, the league rating is determined by using a combination of fan voting and assigned scoring factors. For example, 50% of the league rating is derived from the LPPCR and the other 50% is derived from the fan ratings.

In illustrative embodiments of the present invention, the processor 202 may additionally or alternatively be programmed to calculate a pressure predictor (PP). The pressure predictor is a statistic that rates the accuracy of a particular baseball fan's pressure predictions. In exemplary embodiments, the pressure predictor may also rate the predictability of a player in pressure situations. The pressure predictor may be defined by the following formula:

Pressure Predictor=(Number of Correct PAB Predictions)÷(Number of Total Pab Predictions)

A PAB prediction occurs when a baseball fan votes whether the baseball player will ('yes') or will not ('no') produce a positive pressure contribution (PPC) during a PAB. In other words, the baseball fan votes that the baseball player will either produce a positive pressure contribution or a negative pressure contribution (NPC). The predictions can be received by the processor 202 in a similar fashion to other fan votes on, for example, pressure situations. As explained above, in exemplary embodiments, a positive pressure contribution occurs when any of the following results from a PAB situation: a walk, single, double, triple, home run or grand slam, sacrifice bunt, sacrifice fly, fielder's choice which advances a runner or scores a run, intentional walk, and hit by pitch. In exemplary embodiments, a negative pressure contribution (NPC) occurs when any of the following results from a pressure at bat situation: a strike out, ground out which does not advance the runner or score a run, fly out which does not advance the runner or score a run, fielder's choice which does not advance a runner or score a run, and/or ground into double play or ground into triple play.

Irrespective of how a PPC and NPC are defined, the pressure predictor statistic compares the total number of correct PAB predictions to the total number of PAB predictions. A correct prediction occurs, for example, when a fan votes that a player will produce a positive pressure contribution and the baseball player scores a grand slam. An incorrect prediction occurs, for example, when a fan votes that a player will produce a positive pressure contribution and the baseball player strikes out. In various embodiments, the pressure predictor can be specific to a particular baseball fan. For example, if a fan predicts 15 PPCs correctly out of a total of 20 predictions, then his pressure predictor is 0.75, or 75%. In this manner, the pressure predictor rates the accuracy of a particular baseball fan's pressure predictions. In other embodiments, however, the pressure predictor may be specific to a particular baseball player. For example, if a group of baseball fans made 50 total predictions specific to a baseball player, and only 10 of those were correct, then the baseball player's pressure predictor is 0.20, or 20%. In this manner, the pressure predictor rates the predictability of a particular player in pressure situations.

In illustrative embodiments of the present invention, the processor 202 may additionally or alternatively be programmed to calculate a league pressure predictor (LPP). The league pressure predictor is similar to the pressure predictor, however, the league pressure predictor is more particular in that illustrative embodiments of the league pressure predictor rate the accuracy of a fantasy baseball participant's pressure predictions. In other exemplary embodiments, the league pressure predictor may also rate the predictability of a player in pressure situations based on fantasy baseball participants' predictions. The league pressure predictor may be defined by the following formula:

League Pressure Predictor=(Number of Correct LPAB predictions)÷(Number of Total LPAB Predictions)

A LPAB prediction occurs when a fantasy baseball participant votes whether the baseball player will ('yes') or will not ('no') produce a positive pressure contribution (LPPC) during a LPAB. In other words, the fantasy baseball participant votes that the baseball player will either produce a positive pressure contribution or a negative pressure contribution (LNPC). In exemplary embodiments, the LPPC and LNPC are defined by the fantasy baseball participants. For example, fantasy baseball participants may define a LPPC as any one of: a walk, single, double, triple, home run or grand slam, sacrifice bunt, sacrifice fly, fielder's choice which advances a runner or scores a run, intentional walk, and hit by pitch. In illustrative embodiments, fantasy baseball participants may define a LNPC as any one of a: a strike out, ground out which does not advance the runner or score a run, fly out which does not advance the runner or score a run, fielder's choice which does not advance a runner or score a run, and/or ground into double play or ground into triple play.

Irrespective of how the LPPC and LNPC are defined, the league pressure predictor (LPP) statistic compares the total number of correct LPAB predictions to the total number of LPAB predictions. A correct prediction occurs, for example, when a fantasy baseball participant votes that a player will produce a negative pressure contribution and the baseball player strikes out. An incorrect prediction occurs, for example, when a fantasy baseball participant votes that a player will produce a negative pressure contribution and the baseball player scores a home run. In various embodiments, the league pressure predictor can be specific to a particular fantasy baseball participant. For example, if a fantasy baseball participant predicts 20 PPCs correctly out of a total of 40 predictions, then his pressure predictor is 0.50, or 50%. In this manner, the league pressure predictor rates the accuracy of a particular fantasy baseball participant's pressure predictions. In other embodiments, however, the league pressure predictor may be specific to a particular baseball player. For example, if a number of fantasy baseball participants made 200 total predictions specific to a baseball player, and 120 of those were correct, then the baseball player's pressure predictor is 0.60, or 60%. In this manner, the league pressure predictor rates the predictability of a particular player in pressure situations.

A number of different baseball fans may find illustrative embodiments of the present invention advantageous. For example, illustrative embodiments of the present invention help baseball fans define how valuable their favorite players are and, likewise, how inept their despised players are in pressure situations. Baseball fans may also be able to define what a pressure situation is and show how accurate they are in predicting whether a player will succeed or fail in a pressure situation. Other baseball fans, such as Major League Baseball (MLB) itself, baseball players, and their agents, may be able to advantageously measure the intangible value of being a "pressure hitter" for use in contract negotiations.

Illustrative embodiments of the present invention also allow fantasy baseball participants to track and rate player performance in pressure situations. Furthermore, illustrative embodiments of the present invention allow fantasy baseball operators to offer tracking and rating of player performance in pressure situations as a new way to attract more managers/participants and/or to keep existing managers/participants engaged throughout the season and post-season. Similarly, illustrative embodiments of the present invention may allow MLB to offer baseball fans tracking and rating of player performance in pressure situations as a new way to attract more fans and to keep existing fans engaged throughout the season and post-season.

It should be noted that terms such as "processor" and "server" may be used herein to describe devices that may be used in certain embodiments of the present invention and should not be construed to limit the present invention to any particular device type or system unless the context otherwise requires. Thus, a system may include, without limitation, a client, server, computer, appliance, or other type of device. Such devices typically include one or more network interfaces for communicating over a communication network and a processor (e.g., a microprocessor with memory and other peripherals and/or application-specific hardware) configured accordingly to perform device and/or system functions. Communication networks generally may include public and/or private networks; may include local-area, wide-area, metropolitan-area, storage, and/or other types of networks; and may employ communication technologies including, but in no way limited to, analog technologies, digital technologies, optical technologies, wireless technologies, networking technologies, and internetworking technologies.

It should also be noted that devices may use communication protocols and messages (e.g., messages created, transmitted, received, stored, and/or processed by the system), and such messages may be conveyed by a communication network or medium. Unless the context otherwise requires, the present invention should not be construed as being limited to any particular communication message type, communication message format, or communication protocol. Thus, a communication message generally may include, without limitation, a frame, packet, datagram, user datagram, cell, or other type of communication message. Unless the context requires otherwise, references to specific communication protocols are exemplary, and it should be understood that alternative embodiments may, as appropriate, employ variations of such communication protocols (e.g., modifications or extensions of the protocol that may be made from time-to-time) or other protocols either known or developed in the future.

It should also be noted that logic flows may be described herein to demonstrate various aspects of the invention, and should not be construed to limit the present invention to any particular logic flow or logic implementation. The described logic may be partitioned into different logic blocks (e.g., programs, modules, interfaces, functions, or subroutines) without changing the overall results or otherwise departing from the true scope of the invention. Often times, logic elements may be added, modified, omitted, performed in a different order, or implemented using different logic constructs (e.g., logic gates, looping primitives, conditional logic, and other logic constructs) without changing the overall results or otherwise departing from the true scope of the invention.

The present invention may be embodied in many different forms, including, but in no way limited to, computer program logic for use with a processor (e.g., a microprocessor, microcontroller, digital signal processor, or general purpose computer), programmable logic for use with a programmable logic device (e.g., a Field Programmable Gate Array (FPGA) or other PLD), discrete components, integrated circuitry (e.g., an Application Specific Integrated Circuit (ASIC)), or any other means including any combination thereof. In a typical embodiment of the present invention, predominantly all of the described logic is implemented as a set of computer program instructions that is converted into a computer executable form, stored as such in a computer readable medium, and executed by a microprocessor under the control of an operating system.

Computer program logic implementing all or part of the functionality previously described herein may be embodied in various forms, including, but in no way limited to, a source code form, a computer executable form, and various intermediate forms (e.g., forms generated by an assembler, compiler, linker, or locator). Source code may include a series of computer program instructions implemented in any of various programming languages (e.g., an object code, an assembly language, or a high-level language such as Fortran, C, C++, JAVA, or HTML) for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

The computer program may be fixed in any form (e.g., source code form, computer executable form, or an intermediate form) either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device. The computer program may be fixed in any form in a signal that is transmittable to a computer using any of various communication technologies, including, but in no way limited to, analog technologies, digital technologies, optical technologies, wireless technologies, networking technologies, and internetworking technologies. The computer program may be distributed in any form as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web).

Hardware logic (including programmable logic for use with a programmable logic device) implementing all or part of the functionality previously described herein may be designed using traditional manual methods, or may be designed, captured, simulated, or documented electronically using various tools, such as Computer Aided Design (CAD), a hardware description language (e.g., VHDL or AHDL), or a PLD programming language (e.g., PALASM, ABEL, or CUPL).

Programmable logic may be fixed either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), or other memory device. The programmable logic may be fixed in a signal that is transmittable to a computer using any of various communication technologies, including, but in no way limited to, analog technologies, digital technologies, optical technologies, wireless technologies (e.g., Bluetooth), networking technologies, and internetworking technologies. The programmable logic may be distributed as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web). Of course, some embodiments of the invention may be implemented as a combination of both software (e.g., a computer program product) and hardware. Still other embodiments of the invention are implemented as entirely hardware, or entirely software.

Although various exemplary embodiments of the invention have been disclosed, it should be apparent to those skilled in the art that various changes and modifications may be made which will achieve some of the advantages of the invention without departing from the true scope of the invention.

What is claimed is:

1. A method for providing improved performance metrics to participants in a fantasy baseball league by rating a baseball player's performance in pressure situations, the method comprising:

receiving, by a server over a computer network via an interface from at least one information source, information about at least one at bat situation associated with a player, the interface configured to receive the information from one or more of the following sources: a) game statistics provider devices, b) interactive TVs, c) mobile phones, d) text messages, e) telephones, f) websites, g) sporting organization devices, and h) fantasy sporting organization devices;

receiving in real-time, by the server from a plurality of user devices over the computer network, a plurality of fan ratings for the at least one at bat situation, each fan rating including (1) a rating whether the at least one at bat situation is a pressure at bat and (2) a rating of a performance of the player in an inning;

in a first computer process executing on a processor of the server, comparing in real-time a percentage of fan ratings deeming the at least one at bat situation to be a pressure at bat situation against a threshold to determine whether the at least one at bat situation is a pressure at bat situation;

in a second computer process executing on the processor of the server, if the at least one at bat situations is determined to be an at pressure at bat situation, updating in real-time at least one of (1) a pressure average of the player based on a number of positive pressure contributions by the player and a number of pressure at bat situations associated with the player and (2) a pressure rating of the player based on a summation of an inning rating multiplied by an average fan rating of the performance of the player in the inning for each at pressure at bat situation; and communicating in real-time, by the server over the computer network to a plurality of servers hosting websites and application services, the websites and application services configured to be accessed by the plurality of user devices of the baseball fans, at least one of the updated pressure average or pressure rating if the at least one at bat situations is determined to be a pressure at bat situation.

2. A method according to claim 1, wherein the pressure situation statistic is a pressure average and wherein calculating at least one pressure situation statistic for the player further comprises:

determining, by the processor, for a plurality of pressure at bat situations whether the player positively contributed during each of the plurality of pressure at bat situations and tabulating total positive contributions; and determining, by the processor, the pressure average by comparing the total positive contributions to the total pressure at bat situations for the player.

3. A method according to claim 2, wherein pressure at bat situations are defined by at least one fantasy baseball participant.

4. A method according to claim 2, wherein positive pressure contributions are defined by at least one fantasy baseball participant.

5. A method according to claim 1, wherein the information about the plurality of at bat situations includes the inning associated with each at bat situation;

wherein the pressure situation statistic is a pressure rating; and wherein calculating at least one pressure situation statistic for the player further comprises:

in a third computer process executing on the processor, averaging the plurality of fan ratings for each pressure at bat situation;

in a fourth computer process executing on the processor, determining a product for each pressure at bat situation by multiplying the average fan rating for each at bat situation by an inning rating factor, the inning rating factor based, at least in part, on the inning associated with the at bat situation; and in a fifth computer process executing on the processor, calculating the pressure rating by summing the products for each pressure at bat situation.

6. A method according to claim 5, wherein pressure at bat situations are defined by at least one fantasy baseball participant.

7. A method according to claim 5, wherein the plurality of fan ratings are from fantasy baseball participants.

8. A method according to claim 1, the method comprising:
receiving, by the processor, at least one fan prediction for an at bat situation, the at least one prediction predicting whether a player will contribute positively or negatively during the at bat situation;
wherein the pressure situation statistic is a pressure predictor;
wherein calculating at least one pressure situation statistic further comprises:
in a third computer process executing on the processor, determining whether the player contributed positively or negatively during the at bat situation associated with the at least one fan prediction;
in a fourth computer process executing on the processor, determining whether the at least one fan prediction is correct and tabulating a total number of correct fan predictions; and
in a fifth computer process executing on the processor, calculating a pressure predictor by dividing the total number of correct fan predictions by a total number of fan predictions.

9. A method according to claim 8, wherein the at least one fan prediction is from a fantasy baseball participant.

10. A method according to claim 8, wherein the pressure predictor is specific to a particular baseball fan.

11. A method according to claim 8, wherein the pressure predictor is specific to a particular baseball player.

12. A non-transitory computer readable medium encoded with instructions for providing improved performance metrics to participants in a fantasy baseball league by rating a baseball player's performance in pressure situations, which when loaded on at least one server, establish processes, comprising:
receiving, over a computer network via an interface from at least one information source, information about at least one at bat situation associated with a player, the interface configured to receive the information from one or more of the following sources: a) game statistics provider devices, b) interactive TVs, c) mobile phones, d) text messages, e) telephones, f) websites, g) sporting organization devices, and h) fantasy sporting organization devices;
receiving in real-time, from a plurality of user devices over the computer network, a plurality of fan ratings for the at least one at bat situation, each fan rating including (1) a rating whether the at least one at bat situation is a pressure at bat and (2) a rating of a performance of the player in an inning;
in a first computer process of the server, comparing in real-time a percentage of fan ratings deeming the at least one at bat situation to be a pressure at bat situation against a threshold to determine whether the at least one at bat situation is a pressure at bat situation;
in a second computer process of the server, if the at least one at bat situations is determined to be an at pressure at bat situation, updating in real-time at least one of (1) a pressure average of the player based on a number of positive pressure contributions by the player and a number of pressure at bat situations associated with the player and (2) a pressure rating of the player based on a summation of an inning rating multiplied by an average fan rating of the performance of the player in the inning for each at pressure at bat situation; and
communicating in real-time, over the computer network to a plurality of servers hosting websites and application services, the websites and application services configured to be accessed by the plurality of user devices of the baseball fans, at least one of the updated pressure average or pressure rating if the at least one at bat situations is determined to be a pressure at bat situation.

13. A non-transitory computer readable medium according to claim 12, wherein calculating at least one pressure situation statistic for the player further comprises:
determining for a plurality of pressure at bat situations whether the player positively contributed during each of the plurality of pressure at bat situations and tabulating total positive contributions; and
determining the pressure average by comparing the total positive contributions to the total pressure at bat situations for the player.

14. A non-transitory computer readable medium according to claim 13, wherein pressure at bat situations are defined by at least one fantasy baseball participant.

15. A non-transitory computer readable medium according to claim 13, wherein positive pressure contributions are defined by at least one fantasy baseball participant.

16. A non-transitory computer readable medium according to claim 12,
wherein the information about the plurality of at bat situations includes the inning associated with each at bat situation;
wherein the pressure situation statistic is a pressure rating; and
wherein calculating at least one pressure situation statistic for the player further comprises:
in a third computer process, averaging the plurality of fan ratings for each pressure at bat situation;
in a fourth computer process, determining a product for each pressure at bat situation by multiplying the average fan rating for each at bat situation by an inning rating factor, the inning rating factor based, at least in part, on the inning associated with the at bat situation; and
in a fifth computer process, calculating the pressure rating by summing the products for each pressure at bat situation.

17. A non-transitory computer readable medium according to claim 16, wherein pressure at bat situations are defined by at least one fantasy baseball participant.

18. A non-transitory computer readable medium to claim 16, wherein the plurality of fan ratings are from fantasy baseball participants.

19. A non-transitory computer readable medium according to claim 12, wherein the instructions establish processes further comprising:

receiving at least one fan prediction for an at bat situation, the at least one prediction predicting whether a player will contribute positively or negatively during the at bat situation;

wherein the pressure situation statistic is a pressure predictor;

wherein calculating at least one pressure situation statistic further comprises:
- in a third computer process, determining whether the player contributed positively or negatively during the at bat situation associated with the at least one fan prediction;
- in a fourth computer process, determining whether the at least one fan prediction is correct and tabulating a total number of correct fan predictions; and
- in a fifth computer process, calculating a pressure predictor by dividing the total number of correct fan predictions by a total number of fan predictions.

20. A non-transitory computer readable medium according to claim 19, wherein the at least one fan prediction is from a fantasy baseball participant.

21. A system for providing improved performance metrics to participants in a fantasy baseball league by rating a baseball player's performance in pressure situations, comprising:
- a processor;
- an interface; and
- a memory storing instructions executable by the processor to perform processes that include:
  - receiving, over a computer network via the interface from at least one information source, information about at least one at bat situation associated with a player, the interface configured to receive the information from one or more of the following sources: a) game statistics provider devices, b) interactive TVs, c) mobile phones, d) text messages, e) telephones, f) websites, g) sporting organization devices, and h) fantasy sporting organization devices;
  - receiving in real-time, from a plurality of user devices over the computer network, a plurality of fan ratings for the at least one at bat situation in real-time, each fan rating including (1) a rating whether the at least one at bat situation is a pressure at bat and (2) a rating of a performance of the player in an inning;
  - in a first computer process of the system, comparing in real-time a percentage of fan ratings deeming the at least one at bat situation to be a pressure at bat situation against a threshold to determine whether the at least one at bat situation is a pressure at bat situation;
  - in a second computer process of the system, if the at least one at bat situations is determined to be an at pressure at bat situation, updating in real-time at least one of (1) a pressure average of the player based on a number of positive pressure contributions by the player and a number of pressure at bat situations associated with the player and (2) a pressure rating of the player based on a summation of an inning rating multiplied by an average fan rating of the performance of the player in the inning for each at pressure at bat situation; and
  - communicating in real-time, over the computer network to a plurality of servers hosting websites and application services, the websites and application services configured to be accessed by the plurality of user devices of the baseball fans, at least one of the updated pressure average or pressure rating if the at least one at bat situations is determined to be a pressure at bat situation.

22. A system according to claim 21, wherein calculating at least one pressure situation statistic for the player further comprises:
- determining for each pressure at bat situation whether the player positively contributed during the pressure at bat situation and tabulating total positive contributions; and
- determining a pressure average by comparing the total positive contributions to the total pressure at bat situations for the player.

23. A system according to claim 22, wherein pressure at bat situations are defined by at least one fantasy baseball participant.

24. A system according to claim 22, wherein positive pressure contributions are defined by at least one fantasy baseball participant.

25. A system according to claim 21,
wherein the information about the plurality of at bat situations includes the inning associated with each at bat situation;
wherein the pressure situation statistic is a pressure rating; and
wherein calculating at least one pressure situation statistic for the player further comprises:
- in a third computer process, averaging the plurality of fan ratings for each pressure at bat situation;
- in a fourth computer process, determining a product for each pressure at bat situation by multiplying the average fan rating for each at bat situation by an inning rating factor, the inning rating factor based, at least in part, on the inning associated with the at bat situation; and
- in a fifth computer process, calculating the pressure rating by summing the products for each pressure at bat situation.

26. A system according to claim 25, wherein pressure at bat situations are defined by at least one fantasy baseball participant.

27. A system according to claim 25, wherein the plurality of fan ratings are from fantasy baseball participants.

28. A system according to claim 21, wherein the memory further stores instructions executable by the processor to perform processes that include:
- receiving at least one fan prediction for an at bat situation, the at least one prediction predicting whether a player will contribute positively or negatively during the at bat situation;
- receiving at least one fan prediction for an at bat situation, the at least one prediction predicting whether a player will contribute positively or negatively during the at bat situation;

wherein the pressure situation statistic is a pressure predictor;

wherein calculating at least one pressure situation statistic further comprises:
- in a third computer process, determining whether the player contributed positively or negatively during the at bat situation associated with the at least one fan prediction;
- in a fourth computer process, determining whether the at least one fan prediction is correct and tabulating a total number of correct fan predictions; and in a fifth computer process, calculating a pressure predictor by dividing the total number of correct fan predictions by a total number of fan predictions.

29. A system according to claim 28, wherein the at least one fan prediction is from a fantasy baseball participant.

* * * * *